(12) United States Patent
Irifune et al.

(10) Patent No.: US 6,696,161 B2
(45) Date of Patent: Feb. 24, 2004

(54) SILICONE COMPOSITION AND RELEASE FILM

(75) Inventors: Shinji Irifune, Gunma-ken (JP); Masahiko Ogawa, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/193,315

(22) Filed: Jul. 12, 2002

(65) Prior Publication Data
US 2003/0035965 A1 Feb. 20, 2003

(30) Foreign Application Priority Data

Jul. 12, 2001 (JP) .......................... 2001-211698

(51) Int. Cl.$^7$ ..................... B32B 9/04; C08L 83/04; C08L 83/05; C08L 83/06; C08L 83/07
(52) U.S. Cl. ................. 428/447; 428/446; 524/860; 524/861; 524/862
(58) Field of Search ................. 428/446, 447; 528/15; 524/858, 860, 861, 862, 863

(56) References Cited

U.S. PATENT DOCUMENTS

| | | | |
|---|---|---|---|
| 3,427,270 A | 2/1969 | Northrup et al. | |
| 4,018,734 A | 4/1977 | Dumoulin | |
| 4,772,515 A | 9/1988 | Hara et al. | |
| 6,025,435 A | * | 2/2000 | Yamakawa et al. ......... 524/862 |
| 6,562,469 B2 | * | 5/2003 | Koyama et al. ............ 428/447 |

FOREIGN PATENT DOCUMENTS

| | | |
|---|---|---|
| GB | 1 469 808 | 6/1974 |
| JP | 46-2187 B | 2/1971 |
| JP | 49-47426 A | 5/1974 |
| JP | 50-141591 A | 11/1975 |
| JP | 52-9469 B | 3/1977 |
| JP | 52-39791 B | 10/1977 |
| JP | 57-77395 A | 5/1982 |
| JP | 63-27560 A | 2/1988 |
| JP | 6-293881 A | 10/1994 |

* cited by examiner

Primary Examiner—Robert Dawson
Assistant Examiner—Michael J Feely
(74) Attorney, Agent, or Firm—Birch, Stewart, Kolasch & Birch, LLP

(57) ABSTRACT

A silicone composition comprising a first organopolysiloxane containing T units, a second organopolysiloxane, an organohydrogenpolysiloxane, and a platinum catalyst cures into a coating that adheres well to plastic film substrates and even to polyester film substrates which are difficult for conventional solventless silicone compositions to adhere. The cured coating exhibits release properties to pressure-sensitive adhesives, and a film substrate coated with the cured silicone composition provides a release film.

3 Claims, No Drawings

SILICONE COMPOSITION AND RELEASE FILM

This invention relates to silicone compositions capable of adhering to plastic film substrates independent of the type of plastic film, and release films using the same.

BACKGROUND OF THE INVENTION

In the coating art, there are known a variety of silicone release compositions for use in preventing any sticking or adhesion between substrates of paper, plastics or the like and pressure-sensitive adhesives. Of these, solvent type silicone compositions have been widely used because of release properties and relatively low substrate selectivity.

However, the demand for solventless silicone compositions is now increasing from the safety and health standpoints. A number of solventless silicone compositions are known in the art as described in JP-A 49-47426, JP-A 50-141591, JP-B 52-39791 and JP-A 57-77395. These compositions adhere well to paper and laminated paper, but do not adhere well to plastic films.

It was then proposed to blend certain silanes or siloxanes in organopolysiloxane for imparting self-adhesiveness thereto (see JP-B 46-2187 and JP-B 52-9469). Since these compositions cure through condensation reaction, which requires elevated temperatures, they are unsuited for plastic films.

JP-A 63-27560 and JP-A 6-293881 disclose silicone compositions based on an organovinylpolysiloxane having branching points within the molecule, which adhere well to polyolefin film substrates without a need for solvents. However, these silicone compositions raise the problem that they fail to establish satisfactory bonds when applied to polyester film substrates.

SUMMARY OF THE INVENTION

An object of the invention is to provide a silicone composition which cures in the absence of a solvent into a coating that adheres well to plastic film substrates independent of the type of plastic film. Another object is to provide a release film using the same.

It has been found that when first and second organopolysiloxanes specified below are combined, the resulting silicone composition, despite a solventless system, is able to cure into a coating that firmly adheres to plastic film substrates independent of the type of plastic film.

The present invention provides a silicone composition comprising (A) 100 parts by weight of a first organopolysiloxane having the following average compositional formula (1):

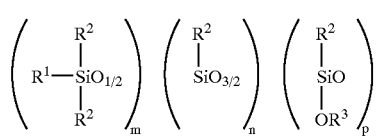

wherein $R^1$ is alkenyl, $R^2$ is a monovalent hydrocarbon radical, $R^3$ is hydrogen or alkyl, m, n and p are such positive numbers in the range: $0.6 \leq (n+p)/m \leq 1.5$ and $0 \leq p/(n+p) \leq 0.05$ that the organopolysiloxane has a viscosity at 25° C. of 5 to 100 mPa·s, (B) 10 to 100 parts by weight of a second organopolysiloxane having the following general formula (2):

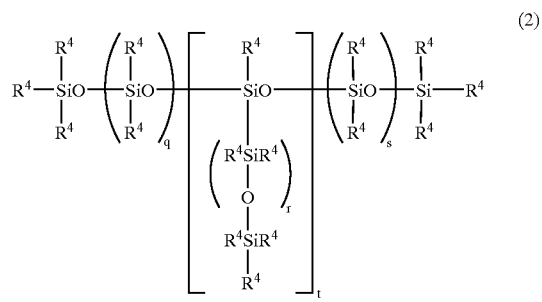

wherein $R^4$ is a monovalent hydrocarbon radical, at least two of the entire $R^4$ radicals are alkenyl, t is a number from 0 to 15, q, r, s and t are such numbers that the organopolysiloxane has a viscosity at 25° C. of from 100 mPa·s to a 30% toluene dilute-solution viscosity of 20,000 mPa·s, (C) 30 to 100 parts by weight of an organohydrogenpolysiloxane having at least two hydrogen atoms each directly attached to a silicon atom per molecule, and (D) a catalytic amount of a platinum group metal catalyst.

The present invention also provides a release film in which a cured coating of the silicone composition is formed on a plastic film substrate.

DESCRIPTION OF THE PREFERRED EMBODIMENTS (A) First Organopolysiloxane

The first organopolysiloxane is the most important component in the silicone composition of the invention and has the following average compositional formula (1).

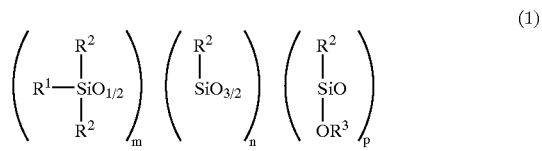

Herein $R^1$ is alkenyl, $R^2$ is a monovalent hydrocarbon radical, and $R^3$ is hydrogen or alkyl. Suitable alkenyl radicals represented by $R^1$ are those having 2 to 8 carbon atoms, such as vinyl, allyl, butenyl, pentenyl and hexenyl. Suitable monovalent hydrocarbon radicals represented by $R^2$ are those having 1 to 8 carbon atoms, for example, alkenyl radicals such as vinyl, allyl, butenyl and pentenyl as exemplified for $R^1$, alkyl radicals such as methyl, ethyl and propyl, aryl radicals such as phenyl, aralkyl radicals such as benzyl, and substituted ones of the foregoing radicals in which some or all of the hydrogen atoms are substituted with halogen atoms. Suitable alkyl radicals represented by $R^3$ are those having 1 to 6 carbon atoms, such as methyl, ethyl and propyl.

The subscripts m, n and p are such positive numbers that the first organopolysiloxane has a viscosity at 25° C. of 5 to 100 mPa·s, preferably 10 to 50 mPa·s. The value of (n+p)/m is from 0.6 to 1.5, and preferably from 0.8 to 1.2. If (n+p)/m<0.6, the adhesion to plastic film declines. If (n+p)/m>1.5, which indicates a higher proportion of $R^2SiO_{3/2}$ units, it is difficult to synthesize such organopolysiloxanes. The value of p/(n+p) is from 0 to 0.05, and preferably from 0 to 0.03. If p/(n+p)>0.05, which indicates a higher content of hydroxyl or alkoxy radicals, the resulting silicone composition becomes less curable.

As described above, the first organopolysiloxane has a viscosity at 25° C. of 5 to 100 mPa·s. A viscosity of less than 5 mPa·s detracts from curability whereas a viscosity of more than 100 mPa·s detracts from adhesion.

The first organopolysiloxane should preferably have a vinyl value of 0.5 to 2.25 mol/100 g, and more preferably 0.5 to 1.0 mol/100 g.

The first organopolysiloxane can be prepared, for example, by subjecting a trialkoxymethylsilane and a dialkenyltetramethyldisiloxane or hexamethyldisiloxane in an alcohol solvent to cohydrolysis in the presence of an acid catalyst, neutralizing, removing the alcohol by-product, washing with water, and removing the unreacted reactants.

(B) Second Organopolysiloxane

The second organopolysiloxane is a component that largely governs the release force of a cured coating of the silicone composition. By altering the structure and substituents of this component, the release properties of the cured coating can be controlled. The second organopolysiloxane has the following general formula (2).

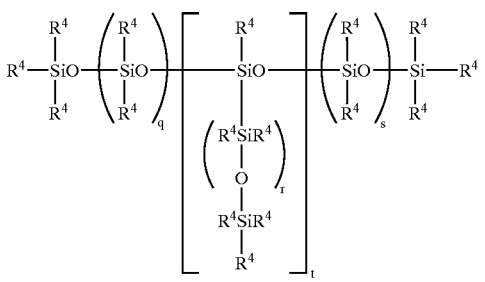

(2)

Herein $R^4$ is a monovalent hydrocarbon radical, preferably those radicals of 1 to 8 carbon atoms, as exemplified above for $R^2$. At least two of the entire $R^4$ radicals should be alkenyl.

The subscripts q, r, s and t are such numbers that the second organopolysiloxane has a viscosity at 25° C. in a range from 100 mPa·s to a 30% toluene dilute-solution viscosity of 20,000 mPa·s, and especially in a range from 200 mPa·s to a 30% toluene dilute-solution viscosity of 5,000 mPa·s, while t is in the range: $0 \leq t \leq 15$, and especially $0 \leq t \leq 6$. If the viscosity of the second organopolysiloxane is less than 100 mPa·s, the resulting silicone composition becomes less viscous and less effective to apply to film substrates. If the 30% toluene dilute-solution viscosity exceeds 20,000 mPa·s, the resulting silicone composition becomes too viscous and less efficient to apply.

The second organopolysiloxane may be used singly or in admixture of two or more. Preferably, the second organopolysiloxane contains 10 to 50% by weight based on the entire second organopolysiloxane of an organopolysiloxane having a 30% toluene dilute-solution viscosity of 1,000 to 10,000 mPa·s at 25° C. and especially 2,000 to 5,000 mPa·s at 25° C., and a vinyl value in average molecule of at least 0.02 mol/100 g, more preferably 0.02 to 0.2 mol/100 g, and even more preferably 0.02 to 0.08 mol/100 g. The preferred second organopolysiloxane ensures that the resulting silicone composition provides a cured coating having satisfactory adhesion, release properties and wear resistance. It is preferred to use an organopolysiloxane having a viscosity at 25° C. of 200 to 1,000 mPa·s and a vinyl value of 0.01 to 0.10 mol/100 g as the remainder of the second organopolysiloxane.

An appropriate amount of the second organopolysiloxane blended is 10 to 100 parts by weight, and preferably 10 to 50 parts by weight, per 100 parts by weight of the first organopolysiloxane. With less than 10 parts of the second organopolysiloxane, the release force of cured coatings increases beyond the practical level. More than 100 parts of the second organopolysiloxane detracts from the adhesion of cured coatings to plastic film substrates.

(C) Organohydrogenpolysiloxane

The organohydrogenpolysiloxane used herein has at least two hydrogen atoms each directly attached to a silicon atom (i.e., SiH radicals) per molecule. Addition reaction takes place between SiH radicals in the organohydrogenpolysiloxane and alkenyl radicals in the first and second organopolysiloxanes whereby the composition cures, that is, a cured coating forms. Preferred organohydrogenpolysiloxane has the following average formula (3).

(3)

Herein $R^5$ stands for substituted or unsubstituted monovalent hydrocarbon radicals, preferably such radicals of 1 to 8 carbon atoms and free of aliphatic unsaturation, for example, alkyl radicals such as methyl, ethyl and propyl, aryl radicals such as phenyl, and halo-alkyl radicals such as 3,3,3-trifluoropropyl. The subscripts a and b are numbers in the range: $0.5 \leq a \leq 1.5$, $0.5 \leq b \leq 1.5$ and $1.0 \leq a+b \leq 3.0$, and preferably $0.8 \leq a \leq 1.0$, $0.8 \leq b \leq 1.0$ and $1.6 \leq a+b \leq 2.0$.

The amount of the organohydrogenpolysiloxane blended is determined in accordance with the amount of alkenyl radicals included in the first ad second organopolysiloxanes. From the standpoints of cure and release properties of coatings, an appropriate amount is usually 30 to 100 parts by weight per 100 parts by weight of the first organopolysiloxane. Less than 30 parts of the organohydrogenpolysiloxane leads to under-cure whereas more than 100 parts increases the release force beyond the necessity.

(D) Platinum Group Metal Catalyst

The platinum group metal catalyst serves to promote the addition reaction of the first and second organopolysiloxanes with the organohydrogenpolysiloxane. Any of well-known addition reaction catalysts is useful. Suitable platinum group metal catalysts include platinum, palladium and rhodium base catalysts, with the platinum base catalysts being preferred. Examples of the platinum base catalysts include chloroplatinic acid, alcohol and aldehyde solutions of chloroplatinic acid, and complexes of chloroplatinic acid with olefins and vinylsiloxane.

The platinum group metal catalyst is added in a catalytic amount. For obtaining satisfactory cured coatings and from the economical standpoint, it is preferred that the platinum group metal catalyst be added in an amount of 1 to 1,000 ppm of platinum group metal based on the total amount of the first and second organopolysiloxane and the hydrogenpolysiloxane.

The silicone composition of the invention is obtained by formulating predetermined amounts of the above-described components (A) to (D). Optional components may be added to the essential components. Suitable components which can be added if desired include activity suppressing agents such as organic nitrogen compounds, organic phosphorus compounds, acetylene compounds, oxime compounds and organic chlorine compounds useful for the purpose of suppressing the catalytic activity of the platinum group metal catalyst; and silicone resins, silica and organopolysiloxanes free of silicon atom-attached hydrogen atoms (SiH radicals) and alkenyl radicals useful for the purpose of controlling the release force. The optional components may be added in conventional amounts as long as this does not compromise the objects of the invention.

In the preferred process of preparing the silicone composition according to the invention, components (A) to (C) and optional components, if necessary, are intimately premixed before component (D) is added thereto. It is noted that for each component, one or more compounds may be used. If desired, the silicone composition can be diluted with an organic solvent such as toluene or hexane prior to use.

The silicone composition thus prepared is applied to a plastic film substrate and heat cured thereto, giving a release film. Suitable examples of the plastic film substrate include polyolefin films such as biaxially oriented polypropylene films, polyethylene films and ethylene-propylene copolymer films, and polyester films. The thickness of such film substrate is not critical although film substrates of about 5 μm to about 100 μm thick are preferably used. The coating weight of the silicone composition on the film substrate is not critical although a coating weight of about 0.1 to about 2.0 g/m² is usually employed.

Preferably the silicone composition is cured by heating at a temperature of about 50° C. to about 200° C. for a time of about 1 second to about 5 minutes.

EXAMPLE

Examples of the invention are given below by way of illustration and not by way of limitation. The physical properties reported in Table 2 were measured by the test methods described below.

Curability

A silicone composition, immediately after its preparation, was applied to each film substrate in a coating weight of 0.4 g/m² and heated in a hot air dryer at 120° C. for a predetermined time, forming a cured coating. The cured coating was rubbed several times with a finger, and visually observed whether or not it was smeared and rubbed (or crumbled) off. Curability is represented by the time (sec) required for curing.

Adhesion

A silicone composition, immediately after its preparation, was applied to each film substrate in a coating weight of 0.4 g/m² and heated in a hot air dryer at 120° C. for a predetermined time, forming a cured coating. The cured coating was aged for one day at room temperature before it was rubbed several times with the finger, and visually observed whether or not it was smeared and rubbed (or crumbled) off. This is reported as initial adhesion. Separately, the cured coating was aged for 14 days in a hot air dryer at 50° C. before it was rubbed several times with a finger, and visually observed whether or not it was smeared and rubbed off. This is reported as aged adhesion.

Release Force

A cured coating was formed on a substrate by curing a silicone composition thereto by the same procedure as the cure test. An acrylic pressure-sensitive adhesive BPS-5127 (Toyo Ink Co., Ltd.) was applied onto the cured coating and heat treated at 100° C. for 3 minutes. Then an overlay film of the same material as the substrate was attached to the surface of the coated substrate on which the adhesive had been applied and treated. The laminate was cut into strips of 5 cm wide and aged one day at room temperature. Using a tensile tester, the overlay film was peeled from the sample at an angle of 180° and a pull rate of 0.3 m/min. The force required for peeling is reported as release force.

Adhesion Retentivity

A cured coating was formed on a substrate by curing a silicone composition thereto by the same procedure as the release force test. A polyester tape Nitto 31B (trade name, Nitto Denko Co., Ltd.) was attached to the surface of the cured coating, placed under a load of 1976 Pa, and heat treated at 70° C. for 20 hours. Thereafter, the tape was removed and attached to a stainless steel plate again. Using a tensile tester, the force required to peel the treated tape from the steel plate was similarly measured. A percentage of the force for the treated tape relative to the force required to peel a fresh (untreated) tape from the stainless steel plate is reported as adhesion retentivity.

Next, the preparation of silicone bases used in Examples and Comparative Examples is described.

Silicone Base Preparation Example

Preparation of Silicone Base 1

Silicone Base 1 was prepared by intimately mixing 50 parts by weight of an organopolysiloxane of the average compositional formula (4) below, having a viscosity at 25° C. of 27 mPa·s and a vinyl value of 0.58 mol/100 g, 13 parts by weight of dimethylpolysiloxane containing vinyl radicals at ends and pendants and having a 30% toluene dilute-solution viscosity of 5000 mPa·s at 25° C. and a vinyl value of 0.070 mol/100 g, 36 parts by weight of methylhydrogenpolysiloxane of the average compositional formula (5) below, and 1.0 part by weight of ethynyl cyclohexanol.

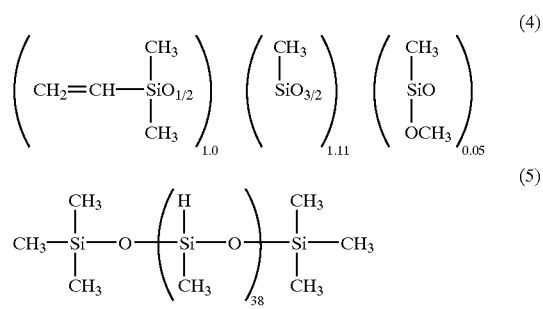

Preparation of Silicone Base 2

Silicone Base 2 was prepared by intimately mixing 97.6 parts by weight of a both end vinyl-terminated dimethylpolysiloxane having a viscosity of 400 mPa·s at 25° C. and a vinyl value of 0.02 mol/100 g, 2.1 parts by weight of methylhydrogenpolysiloxane of the average compositional formula (5), and 0.3 part by weight of ethynyl cyclohexanol.

Preparation of Silicone Base 3

Silicone Base 3 was prepared by intimately mixing 48 parts by weight of a polysiloxane containing vinyl radicals at ends and pendants of the average compositional formula (6) below, having a viscosity of 35 mPa's at 25° C. and a vinyl value of 0.60 mol/100 g, 12 parts by weight of dimethylpolysiloxane containing vinyl radicals at ends and pendants and having a 30% toluene dilute solution viscosity of 5000 mPa·s at 25° C. and a vinyl value of 0.070 mol/100 g, 39 parts by weight of methylhydrogenpolysiloxane of the average compositional formula (5), and 1.0 part by weight of ethynyl cyclohexanol.

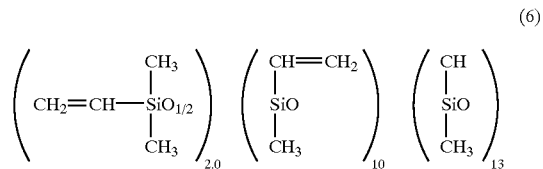

Example 1

A silicone composition was prepared by adding 3 parts by weight (600 ppm calculated as platinum) of the complex salt of chloroplatinic acid with vinylsiloxane to 100 parts by weight of Silicone Base 1 and thoroughly mixing them. Table 1 reports the contents of components (A), (B), (C) and a polysiloxane component other than components (A) to (C) in the silicone composition.

The silicone composition was determined for cure, adhesion, release force and adhesion retentivity by the respective test methods. The results are shown in Table 2.

Example 2

A silicone composition was prepared by admixing 75 parts by weight of Silicone Base 1 and 25 parts by weight of Silicone Base 2, adding 3 parts by weight (600 ppm calculated as platinum) of the complex salt of chloroplatinic acid with vinylsiloxane thereto, and thoroughly mixing them. Table 1 reports the contents of components (A), (B), (C) and a polysiloxane component other than components (A) to (C) in the silicone composition.

The silicone composition was determined for cure, adhesion, release force and adhesion retentivity by the respective test methods. The results are shown in Table 2.

Comparative Example 1

A silicone composition was prepared by admixing 75 parts by weight of Silicone Base 3 and 25 parts by weight of Silicone Base 2, adding 3 parts by weight (600 ppm calculated as platinum) of the complex salt of chloroplatinic acid with vinylsiloxane thereto, and thoroughly mixing them. Table 1 reports the contents of components (A), (B), (C) and a polysiloxane component other than components (A) to (C) in the silicone composition.

The silicone composition was determined for cure, adhesion, release force and adhesion retentivity by the respective test methods. The results are shown in Table 2.

Comparative Example 2

A silicone composition was prepared by admixing 50 parts by weight of Silicone Base 1 and 50 parts by weight of Silicone Base 2, adding 3 parts by weight (600 ppm calculated as platinum) of the complex salt of chloroplatinic acid with vinylsiloxane thereto, and thoroughly mixing them. Table 1 reports the contents of components (A), (B), (C) and a polysiloxane component other than components (A) to (C) in the silicone composition.

The silicone composition was determined for cure, adhesion, release force and adhesion retentivity by the respective test methods. The results are shown in Table 2.

Comparative Example 3

A silicone composition was prepared by adding 3 parts by weight (600 ppm calculated as platinum) of the complex salt of chloroplatinic acid with vinylsiloxane to 100 parts by weight of Silicone Base 2, and thoroughly mixing them. Table 1 reports the contents of components (A), (B), (C) and a polysiloxane component other than components (A) to (C) in the silicone composition.

The silicone composition was determined for cure, adhesion, release force and adhesion retentivity by the respective test methods. The results are shown in Table 2.

TABLE 1

| | Composition | | | | |
|---|---|---|---|---|---|
| | Example | | Comparative Example | | |
| Component, pbw | 1 | 2 | 1 | 2 | 3 |
| Component A | 100.0 | 100.0 | — | 100.0 | — |
| Other polysiloxane | — | — | 100.0 | — | — |
| Component B | 25.0 | 88.9 | 92.8 | 216.8 | 97.6 |
| Component C | 69.6 | 71.0 | 82.8 | 73.8 | 2.2 |

Note:
Other polysiloxane is a polysiloxane component other than components (A) to (C), which has approximately the same viscosity and vinyl value as component (A), but a different structure (not containing T units).
Comparative Example 3 corresponds to a conventional solventless silicone composition for release paper.

TABLE 2

| | | Release properties | | | | |
|---|---|---|---|---|---|---|
| | | Example | | Comparative Example | | |
| Test properties | Substrate | 1 | 2 | 1 | 2 | 3 |
| Curability (sec) | OPP | 15 | 15 | 15 | 15 | 15 |
| Initial adhesion | | ○ | ○ | ○ | ○ | X |
| Aged adhesion | | ○ | ○ | X | X | X |
| Curability (sec) | PET | 30 | 30 | 30 | 30 | 30 |
| Initial adhesion | | ○ | ○ | X | Δ | X |
| Aged adhesion | | ○ | ○ | X | X | X |
| Release force (N/5 cm) | | 10.5 | 1.2 | 2.3 | 0.7 | 0.3 |
| Adhesion retentivity (%) | | 99 | 98 | 99 | 99 | 97 |

Note:
OPP: oriented polypropylene film
PET: polyester film
Adhesion is rated "○" for no rub-off and no smear,
"Δ" for some smear, and
"X" for rub-off.

Table 2 indicates that the silicone compositions within the scope of the invention satisfactorily adhere to film substrates, and the release force can be adjusted by changing the amount and type of the second organopolysiloxane, as demonstrated by Examples 1 and 2. A comparison of Example 1 with Comparative Example 1 reveals that adhesion largely depends on the inclusion of T units in the first organopolysiloxane according to the invention. A comparison of Examples 1 and 2 with Comparative Example 2 reveals that high adhesion is not established unless the blend ratio of the first to second organopolysiloxane falls in the range defined by the present invention. Comparative Example 3 indicates that a conventional solventless silicone composition for release paper does not firmly adhere to film substrates.

The silicone composition of the invention cures into a coating that adheres well to plastic film substrates independent of the type of plastic film and even to polyester film substrates which are difficult for conventional solventless silicone compositions to adhere. The cured coating exhibits release properties to pressure-sensitive adhesives and can be utilized as release film.

Japanese Patent Application No. 2001-211698 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A silicone composition comprising
   (A) 100 parts by weight of a first organopolysiloxane having the following average compositional formula (1):

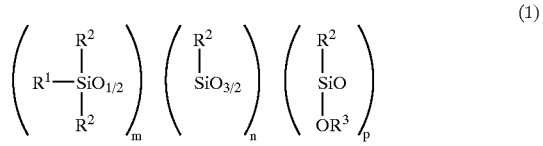

wherein $R^1$ is alkenyl, $R^2$ is a monovalent hydrocarbon radical, $R^3$ is hydrogen or alkyl, m, n and p are such positive numbers in the range: $0.6 \leq (n+p)/m \leq 1.5$ and $0 \leq p/(n+p) \leq 0.05$ that the organopolysiloxane has a viscosity at 25° C. of 5 to 100 mPa·s, (B) 10 to 100 parts by weight of a second organopolysiloxane having the following general formula (2):

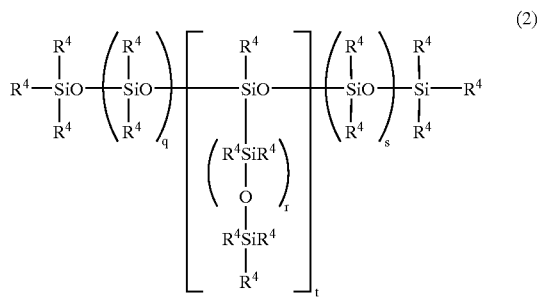

wherein $R^4$ is a monovalent hydrocarbon radical, at least two of the entire $R^4$ radicals are alkenyl, t is a number from 0 to 15, q, r, s and t are such numbers that the organopolysiloxane has a viscosity at 25° C. of from 100 mPa·s to a 30% toluene dilute-solution viscosity of 20,000 mPa·s, (C) 30 to 100 parts by weight of an organohydrogenpolysiloxane having at least two hydrogen atoms each directly attached to a silicon atom per molecule, and (D) a catalytic amount of a platinum group metal catalyst.

2. The silicone composition of claim 1 wherein the second organopolysiloxane contains 10 to 50% by weight of an organopolysiloxane having a 30% toluene dilute-solution viscosity of 1,000 to 10,000 mPa·s at 25° C. and a vinyl value in average molecule of at least 0.02 mol/100 g.

3. A release film in which a cured coating of the silicone composition of claim 1 is formed on a plastic film substrate.

* * * * *